United States Patent [19]

Stahl

[11] 4,172,474
[45] Oct. 30, 1979

[54] FLEXIBLE PLASTIC TUBE

[75] Inventor: Eugen H. Stahl, Böttingen, Fed. Rep. of Germany

[73] Assignee: Hans Grohe GmbH & Co KG, Fed. Rep. of Germany

[21] Appl. No.: 906,757

[22] Filed: May 17, 1978

[30] Foreign Application Priority Data

May 20, 1977 [DE] Fed. Rep. of Germany ....... 2722928

[51] Int. Cl.² ............................................ F16L 11/08
[52] U.S. Cl. .................................. 138/132; 138/122; 138/129; 138/144
[58] Field of Search ............... 138/129, 132, 122, 121, 138/144, 148, 138

[56] References Cited

U.S. PATENT DOCUMENTS

| 2,798,508 | 7/1957 | Kahn ..................................... | 138/133 |
| 3,137,319 | 6/1964 | St. John et al. ........................ | 138/132 |
| 4,098,298 | 7/1978 | Vohrer .............................. | 138/132 X |

FOREIGN PATENT DOCUMENTS 405836  7/1966  Sweden .................................... 138/129

Primary Examiner—Richard E. Aegerter
Assistant Examiner—James E. Bryant, III
Attorney, Agent, or Firm—McGlew and Tuttle

[57] ABSTRACT

A flexible plastic tube, comprises, an extruded inner tube or tubular portion and an extruded outer tube or tubular portion of a thermoplastic material overlying the inner tubular portion and spaced radially outwardly therefrom and including a reinforcing strip of substantially U-shape configuration wound around the inner portion and bonded to the inner and outer tubular portions. The reinforcing strip has radially extending sidewalls in the form of fins which define a first cavity therebetween and, in addition, successive turns of the reinforcing strip define a second cavity therebetween which is located between the outer and inner walls. The sidewalls advantageously have radially outwardly tapered cross-sectional shapes. The inner wall is first extruded and may advantageously be reinforced by embedding axially reinforcing fibers in its outer surface and, while it is still not set, the reinforcing strips of a harder material in the inner and outer walls are wound around the inner wall so that it becomes bonded to the inner wall as the inner wall is set. Thereafter, the outer wall is extruded and bonded immediately to the leg portions of the reinforcing strip. In addition, a metalized material may be positioned by alignment of grooves into the first cavity between the sidewalls of the reinforcing strip and applied under tension during the application of the outer wall.

15 Claims, 7 Drawing Figures

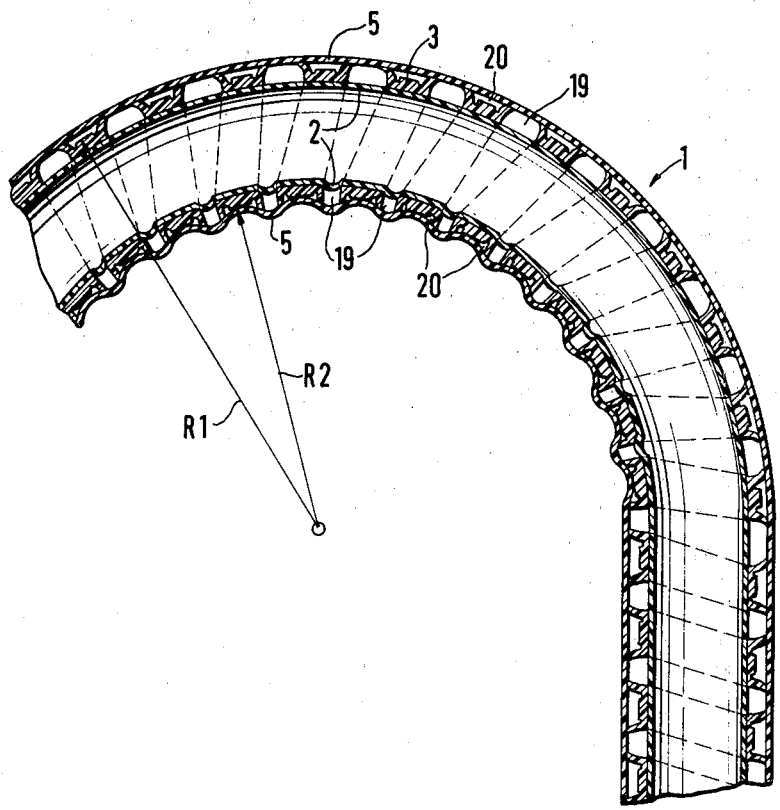

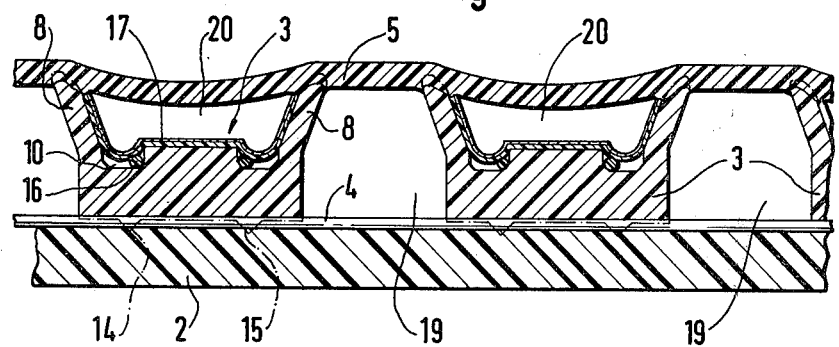
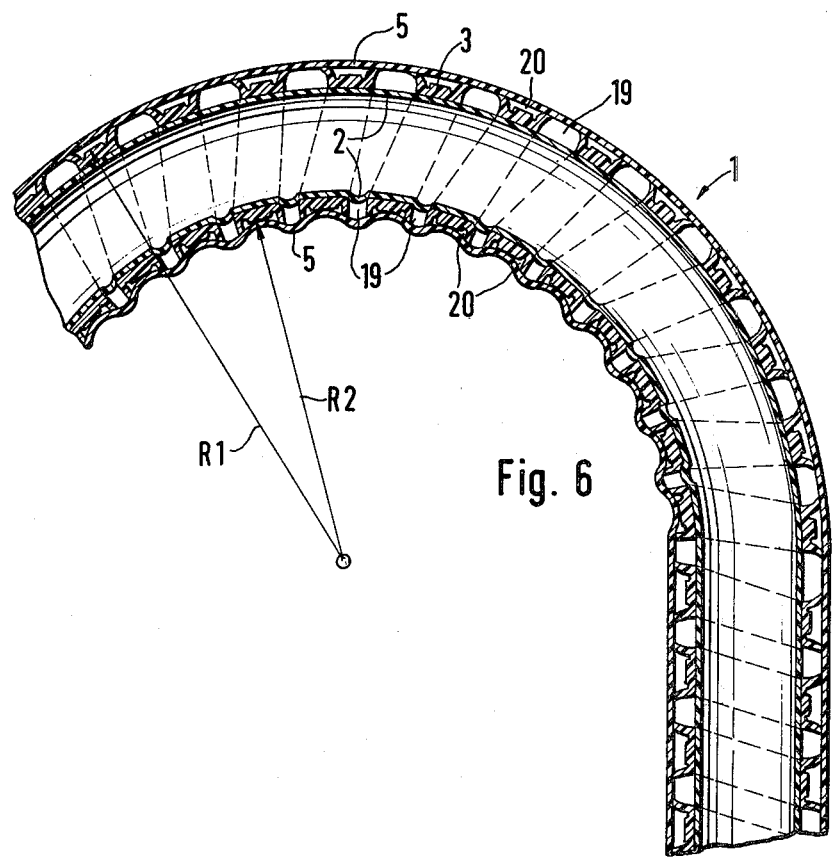

FLEXIBLE PLASTIC TUBE

FIELD AND BACKGROUND OF THE INVENTION

This invention relates to the construction of flexible plastic tubes in general and, in particular, to a new and useful flexible plastic tube and a method of making the same which includes a reinforcing strip wound around an inner tubular portion and bonded thereto and having side legs which extend radially outwardly from each side of the reinforcing strip which is bonded into the outer wall.

DESCRIPTION OF THE PRIOR ART

In a tube of the above-mentioned type, known from German Offenlegungsschrift No. 2,261,126, a wire is helically wound directly on the inner tube and is accommodated in a helical cavity which is formed between the inner tube and outer tube, and has a small axial extension as compared to the winding pitch of the wire. A band of a relatively hard, thermoplastic or elastomeric material is wound between the wire turns and parallel thereto. The inner tube, the band, and the outer tube are firmly joined to each other, while the wire helix is freely movable within the helical cavity.

To ensure this mobility of the wire, the wire must be made of a material which does not enter into any mechanical junction with the materials of the inner and outer tubes and of the band. Inner tube, outer tube, and band are made of polyvinyl chloride, referred to as PVC in the following description, while the helical wire is made of a polyamide, polyolefine, or even of metal, see German Offenlegungsschrift No. 2,261,126.

In this plastic tube of the prior art, the wire helix is the sole stabilizing element. The band, which is wound between the turns of the wire helix and does not extend laterally quite up to the wire, turns, and exclusively serves the purpose of preventing the inner tube, in the zones between the wire turns, from forming inwardly directed folds when the tube is bent. It is also made of a soft, and therefore, elastic material. Thus, the purpose of the band is to ensure, notwithstanding the excellent strength of the tube, that even upon bending, the inside surface remains as smooth as possible, without affecting the high flexibility of the tube. With this prior art tube, however, the problem is only partially solved, because as the tube is bent, inwardly directed folds of the inner tube are necessarily formed in the zones of the inner bending radius where the wire turns are applied.

In addition, the contour of this known tube is markedly undulated, which cannot be considered suitable for every use. Further, this prior art tube is distinctly prone to buckling upon being bent to a small radius and there is also a risk that the outer tube will separate from the band or the inner tube, since during the bending of the tube, the radial tensional forces which the wire turns have to withstand, and which they transmit, directly, or indirectly through an intermediate layer, in the radially outward direction, act on the outer tube which, in addition, is acted upon, in the zone of the outer bending radius, by axial tensional forces. These simultaneously occurring tensions may cause a separation of the outer tube from the band or the inner tube. This again entails a danger that upon a strong bending, the inner tube will collapse to a flat shape, which, in the extreme, may reduce the cross-sectional area of passage to zero.

It should be further noted that in its simplest construction, this known tube comprises at least four different elements, namely, the inner tube, the wire helix, the band and the outer tube, all of which must be assembled in a definite operational sequence which is well coordinated in time and space. To this end, it is first provided to form the inner tube by spraying or extruding a thick layer of PVC of about 0.5 mm on a mandrel and then to wind the wire helically on the inner tube, in a first winding station. Subsequently, in a second winding station, the band of hard PVC is wound, on which the outer tube is finally extruded.

Aside from a number of other plastic tubes, which in some instances are formed of spirally or helically wound, overlapping strips with embedded supporting spirals and flat reinforcing bands wound over the joints, (see U.S. Pat. No. 2,798,508), a flexible plastic tube with a helix and axial reinforcing threads is known from German Utility Model No. 6,937,013, in which the smooth inner wall is formed of a cylindrical, extruded inner tube supporting the axial reinforcing threads over which the helix is extruded or wound, and the outside is formed of an outer tube extruded on and snugly enclosing the helix and the threads.

In all of these known plastic tubes, the wire or supporting helix is used to provide the tube with a radial stability which, at the same time, should not disadvantageously affect the flexibility of the tube. Without taking into account the formation of inwardly directed bending folds which are caused during the bending by the suporting or wire spirals and may sometimes reduce the cross-sectional area of passage, the manufacture of such tubes is complicated and expensive since, in each instance, a plurality of winding elements must be applied, as far as possible, simultaneously, and partly in a state suitable for heat sealing, and united with each other. For this purpose, expensive and complicated winding mechanisms in multiple execution are required.

In another known plastic tube (Swiss Pat. No. 405,836), both the outer and the inner tubes are formed of foil bands which are heat-sealed to each other at their edges and are heat-sealed together between the helically extending turns of a reinforcing insert. No empty space (filled only with air) extending from turn to turn is provided between the turns of the reinforcing insert.

The crucial importance of a helical cavity between the individual turns of the reinforcing insert or band for the flexibility of the tube and of the reinforcing band for the formation of folds, during the bending of the tube, is already well known from, for example, German Offenlegungsschrift No. 2,261,126. Tubes without such a cavity of necessity have a substantially reduced flexibility and less favorable conditions for forming folds during bending. The mentioned prior art tubes of Swiss Pat. No. 405,836 and German Offenlegungsschrift No. 2,261,126 are vacuum cleaner tubes which, as compared to a standard water hose, for example, have a relatively large inner diameter, for example, of 1.5 inch=38 mm. With such thick tubes, not only is their outer undulated configuration less conspicuous, but also a smaller flexibility is expected relative to thinner tubes, such as water hoses, which have an inner diameter of 1 inch or less. While with vacuum cleaner tubes, the flexibility thereof is considered satisfactory if the tube allows a bending radius of 10–15 cm, with water hoses, particularly shower hoses, for example, a much higher flexibility is expected, namely, one which permits a bending radius of from 2.5 to 3 cm.

While in the prior art tube of German Offenlegungsschrift No. 2,261,126, the radial stability depends only on the wire helix, in the known tube of Swiss Pat. No. 405,836, this stability results from the cross-sectional shape of the reinforcing insert, which incidentally, attaches more importance to the capability of floating of this insert than to the cross-sectional shape thereof. Only the occluded air increasing the capability of floating is considered important.

As is well known, T-sections, U-sections and double T-sections, when made of a hard or stiff material, are particularly resistant to bending, due to the tension-to-thrust ratio between the outer and inner bending radii. For this reason, such T-sections, double T-sections and U-sections are unsuitable as supporting helices or reinforcing bands for tubes having a small diameter, for example, of 1 inch or less. That is, with a small tube diameter and, consequently, small winding radius, the zones of the outer bending radius are subjected to a very strong tension and the zones at the inner bending radius to an equally strong compression, so that folds are formed on the inside and elongations in excess may occur in the zone of the outer radius, completely frustrating the supporting effect which is just based on the resistance to bending. Experience has also shown that when being wound on a tube of small diameter, radially outwardly projecting legs of a conventional channel section fold flat to the inside or outside, so that the radial stability or the air occlusion to improve the floating capability which is desired cannot be obtained.

SUMMARY OF THE INVENTION

The present invention is directed to a flexible plastic tube which is more stable in the radial direction and more flexible and is easier to manufacture, and comprises an inner tube which, upon being bent within the range of its own flexibility, does not form bending folds along the inner bending radius and remains, at least substantially, smooth.

To this end, in accordance with the invention, a flexible plastic tube is provided in which the helical cavity is empty and bounded laterally, in the axial direction, not only by the narrow sides of a reinforcing strip, but also by continuous reinforcing fins which extend in the longitudinal direction of the strip at each narrow side thereof, while forming another cavity. The fins have a cross-section tapering radially outwardly which diverge symmetrically relative to the median radial plane of the strip, so that the cross-sectional area of the cavity, formed between the fins and the strip, tapers radially outwardly.

Due to the inventive cross-sectional shape of the reinforcing fins of the reinforcing strip, the above-mentioned drawbacks and unfavorable properties for the helical winding of conventional reinforcing sections of the prior art are avoided. The inventive reinforcing strip section may be easily wound on an inner tube having a relatively small outside diameter of about 10 mm. In addition, the surprising effect is thereby obtained that the bending stress produced in the reinforcing fins by the winding, imparts to the tube, a much greater radial stability than that which would be expected in view of the standard resistance to bending of the shaped reinforcing strip.

Due to the presence of the empty cavity between the individual turns of the reinforcing strip and to the particular shape of the cross-section thereof, it is possible for the first time to provide a tube which, with a small inside diameter, is not only extremely flexible, but also extremely stable in the radial direction and, at the same time, provides particularly favorable conditions for the folding of the inner tube during bending. Aside from this, it is of particular advantage that this is obtained without an additional wire helix, i.e., only with a stabilizing element in the form of a reinforcing strip which can be wound onto the inner tube during the extrusion thereof. In addition, the reinforcing strip is best suited to be provided on its outside with a metal foil or metal coating which gives the tube a metalic aspect in general. Thus, the inventive tube is superior to tubes of the prior art not only in its specific properties of flexibility, radial stability and folding capability during bending, but also in its simple manufacture and is, consequently, inexpensive.

The reinforcing fins also very substantially contribute to flexibility of the tube. The crests of the reinforcing fins may be bonded to the outer tube extruded thereon. Because of their relatively thin walls, the fins are laterally flexible, i.e., during the bending, and depending on whether they therefore extend into the zone of the inner or outer radius, they may move toward each other, where the outer and inner tubes are compressed, or move away from each other, where the outer and inner tubes are stretched. Consequently, during the bending of the tube, the widths of the helical intermediate spaces vary, with the result that both an extreme folding at the inner bending radius and a flattening of the tube in the zone of the outer radius are prevented. This is further supported by the fact that alternately extensible and compressible cavities are present not only between the individual turns of the reinforcing strip, but also between the reinforcing fins of the reinforcing strip and the outer tube, and that the cross-section of these cavities can vary during the bending.

In a specific embodiment of the invention, it is provided that the reinforcing fins are offset on the outside of the reinforcing strip from the longitudinal edges thereof toward the center, by approximately ⅓ or ¼ of the width of the strip. In a preferred embodiment, however, the reinforcing fins are provided along the two helically extending longitudinal edges of the reinforcing strip since, in such an embodiment, the outside surface of the reinforcing strip, which is visible through the transparent outer tube, and also the surface of the reinforcing fins facing each other, may be covered with a metal strip or a metalized plastic strip in a very simple manner, to give the finished tube a metalic aspect.

It has proven to be advantageous to design each reinforcing fin with an angle of divergence, in the stretched state of the reinforcing strip, of about 15° to 25°.

According to a development of the invention, two groove-like recesses, which are separated from each other by an intermediate land, are provided on the outside of the reinforcing strip, between the reinforcing fins. These groove-like recesses may also be designated as grooves. The groove-like recesses extend directly adjacent the reinforcing fins, and are advantageous in many respects. With a given thickness of the reinforcing strip, they increase the radial height of the reinforcing fins, for example, reinforcing threads may be inserted in these groove-like recesses.

Another advantage of the groove-like recesses is obtained where it is provided that the inside surfaces of the reinforcing fins and/or the outside surface of the reinforcing strip extending therebetween are covered with a metal foil, for example, aluminum foil, or with a plastic tape coated with a metal layer, for example, an aluminum layer deposited by evaporation. Such metal foils or metalized plastic tapes have been known for a long time in connection with plastic tubes of this kind. Their sole purpose is to give the tube a metalic appearance.

In a known plastic tube of the kind set forth in the preamble of the base claim, this purpose is served by a flat reinforcing band in which a metalized, for example, an aluminum, vapor-coated, polyester strip is embedded and, in addition, underlaid with textile, for example, rayon threads. This meas that the metalic appearance is produced during the extrusion of the reinforcing band, by inserting the aluminum coated polyester strip into the band while the latter is formed by extrusion. Depending on the thickness of the polyester strip, which is flexible, but not elastic, and due to its strength, it provides the reinforcement proper of the tube, thereby, quasi representing the reinforcing band itself, so that the polyester strip must be completely enclosed in a PVC covering, to permit heat-sealing of the reinforcing band to both the outer tube portion and the inner tube portion, with the polyester strip itself being embedded in the PVC covering of the reinforcing band without material integration.

As compared to this complicated manufacturing method, the cross-sectional shape of the inventive reinforcing strip makes it possible to apply a metal foil or metalized plastic tape of suitable width in a substantially simple way, by winding the tape onto the reinforcing strip either simultaneously with the winding of the latter on the inner tube, or, which may be done subsequently, during the extrusion of the outer tube on the reinforcing strip which has already been joined to the inner tube. Since, during the winding of the metalic or metalized tape, which must be done under a certain tension, to ensure a satisfactory smoothness of the surface, the tape adapts to the cross-sectional shape of the reinforcing strip, the two groove-like recesses have the effect of stabilizing the position of the wound tape.

In another design of the invention, an undercut groove may be provided in each of the surfaces of the reinforcing fins facing each other, adjacent the strip surface extending therebetween.

Accordingly, it is an object of the invention to provide a flexible plastic tube which comprises an inner tube or tubular portion of a relatively soft plastic material, and a substantially U-shape reinforcing strip of relatively hard plastic, and having a generally radially extending thin sidewall adjacent each side thereof and being helically wound around the inner tubular portion and bonded thereto, and having an axially spaced apart turn around said inner tubular portion, and including an outer tube or tubular portion covering the inner tube portion and the reinforcing strip, and being bonded to the outer ends of the thin walls of the reinforcing strip and, wherein, the outer wall encloses a first cavity between the thin walls and the inner surface of the reinforcing strip and a second cavity between adjacent turns of the reinforcing strip and said outer wall and said inner wall.

A further object of the invention is to provide a method of making a plastic tube, comprising, extruding an inner tubular portion, applying a reinforcing strip of substantially U-shape cross-section over the inner tubular portion while the inner tubular portion has still not set so that the reinforcing strip becomes bonded to the inner tubular portion, and thereafter, applying an outer tubular portion by extrusion over the reinforcing strip and bonding it to the reinforcing strip.

Another object of the invention is to provide a flexible plastic tube which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 5 is a partial longitudinal sectional view of a complete tube constructed in accordance with the invention; and FIG. 6 is a partial longitudinal, sectional view of a tube constructed in accordance with the invention, indicating the bending thereof.

DESCRIPTION OF THE PREFERRED EMBODIMENTS

Figure 1:
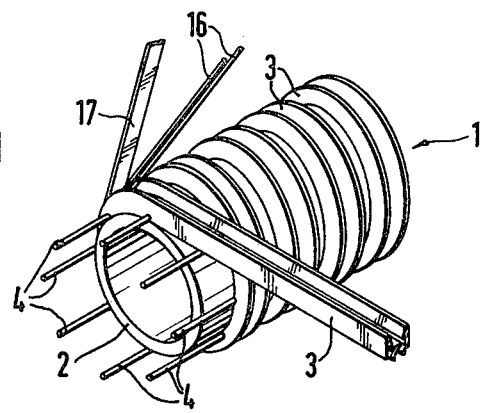
FIG. 1 is a partial perspective view indicating the formation of a plastic tube, constructed in accordance with the invention.

Referring to the drawings in particular, the invention embodied therein as shown in particular in FIGS. 1, 5 and 6, comprises, a composite tube which is made up of an inner tube or tubular portion of a soft material, such as PVC, a substantially U-shaped reinforcing strip 3 of a harder plastic material, and an outer tube or tubular portion of soft PVC material, with the reinforcing strip 3 being bonded to both the inner and outer tubular portions 2 and 5.

FIG. 1 shows a portion of a semi-finished plastic tube 1, in which a U-shape open-topped reinforcing strip 3 is helically wound around the outer surface of an inner tube 2 of soft PVC, with the enclosure of axially extending reinforcing threads 4 which are placed directly on the outer surface of inner tube 2. As may be seen in FIGS. 5 and 6, a finished plastic tube further comprises an outer tube or tubular portion 5 which is extruded onto the reinforcing strip. FIGS. 2, 3, 3a and 4 show different cross-sectional shapes of the reinforcing strip 3, 3'', 31, respectively, of which the design of FIG. 4 has proven to be most advantageous.

Figure 3:
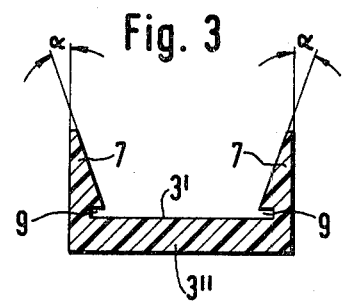
FIG. 3 is a view, similar to FIG. 2, of still another embodiment of the invention.
Figure 3A:
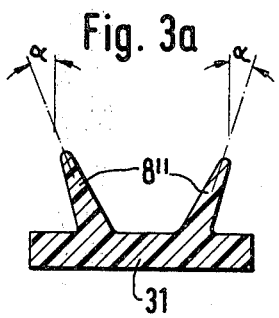
FIG. 3a is a section, similar to FIG. 2, of yet another embodiment of the invention.

In the embodiment of FIG. 3a, reinforcing strip 31 comprises two reinforcing fins 8'' which diverge from each other and are each offset from the edge of the strip toward the center by about ¼ to ⅓ of the strip width. These reinforcing fins 8'' are inclined outwardly, each by an angle of divergence $\alpha$ of about 15° and their function is at least substantially equal to that of reinforcing fins 8 of reinforcing strip 3 shown in FIGS. 4 and 5, which will be explained in more detail hereinafter.

Figure 2:
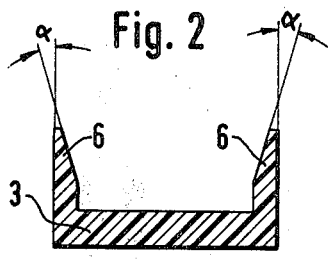
FIG. 2 is a cross-sectional view of another embodiment of the reinforcing strip.
Figure 4:
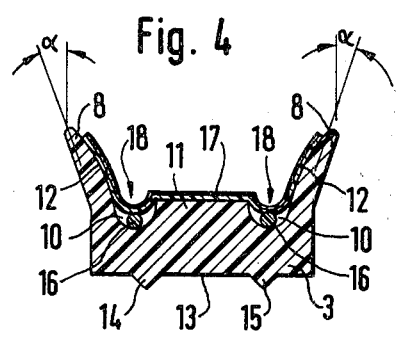
FIG. 4 is a view, similar to FIG. 2, showing another embodiment of reinforcing strip, with a metalized coating thereon.

It is common to the cross-sectional shapes of FIGS. 2, 3 and 4, that on each of its two longitudinal sides, reinforcing strip 3 is provided with continuous, longitudinally extending and readially outwardly projecting reinforcing fins indicated at 6, 7 and 8 for FIGS. 2, 3 and 4, respectively. While reinforcing fins 6 have a cross-sectional shape of a rectangle beveled on the inside, the cross-sectional shape of reinforcing fins 7 resembles a right-angled triangle. In addition, on their insides adjacent the outer surface 3' of the body proper 3" of the strip, reinforcing fins 7 are provided with undercut grooves 9 into which a metal foil or metalized plastic tape 17, as shown in FIG. 5, for example, may be inserted.

In both designs, it is important that the beveled or inclined surfaces of fins 6 and 7 are provided at their facing sides and that they diverge radially outwardly. This is necessary to ensure that, during the winding of reinforcing strip 3 onto inner tube 2 which is formed on a mandrel, the reinforcing fins 6 and 7 do not tilt toward each other, but away from each other, quasi outwardly, as shown, for example, in FIG. 5.

The preferred cross-sectional shape of FIG. 4 differs from those of FIGS. 2 and 3 in several details. First, it may be noted that in the stretched state of strip 3, each of the two reinforcing fins 8 is inclined outwardly by an angle of divergence $\alpha$, and that a groove-like recess 10 is provided at the base of each reinforcing fin 8, with the two recesses being separated from each other by an intermediate land 11. The inside surfaces 12 of reinforcing fins 8 are convex and blend smoothly into recesses 10. In the stretched state of reinforcing strip 3, the angles of divergence $\alpha$ amount to about 20°, and upon winding reinforcing strip 3 onto inner tube 2, they increase to about 25°. Reinforcing strip 3 of the embodiment of FIG. 4 is provided with two claw ribs 14 and 15 of triangular cross-section on its plane underside 13. While both the inner tube 2 and the later applied outer tube 5 are made of a soft PVC material, the reinforcing strip 3 is made of a hard PVC material.

The axial reinforcing threads 4 and reinforcing strip 3 are applied to inner tube 2 directly at the extruder head forming the inner tube, before inner tube 2 cools down, so that a heat-sealed bond is immediately established between reinforcing strip 3 and inner tube 2. At the same time, the claw ribs 14 and 15 are passed over a heated tube so that they are also plasticized, and axial threads 4 can penetrate therein, as shown in FIG. 5. The claw ribs 14 and 15, in turn, penetrate into the outer surface of inner tube 2. Thereby, axial threads 4 are well anchored to the turns of reinforcing strip 3, and the reinforcing strip 3 is well anchored to inner tube 2.

During the operation of winding reinforcing strip 3 onto the inner tube 2, further reinforcing threads 16 are passed into the grooves or recesses 10 and, at the same time, a metalized plastic tape 17 is wound over the reinforcing threads. The tape 17 is fed in under tension and occupies the position, and assumes the shape, shown in FIGS. 4 and 5. The width of the metalized plastic tape is selected so as to cover not only the area between adjacent reinforcing fins 8, 8 of reinforcing strip 3, but also the convex inner surfaces 12 of the reinforcing fins 8, except for the portions of the fins 8 which become embedded in, and heat-sealed to, the outer tube 5 during the extrusion thereof. In this way, the entire surface of reinforcing strip 3, visible from the outside through outer tube 5, is covered with the metalized plastic tape.

In FIGS. 4 and 5, it may be noted that the metalized plastic tape, which is fed in under tension, forms depressions 18 in the area of groove-like recesses 10. These depressions 18 substantially contribute to the lateral positional stability of the metalized plastic tape 17 on reinforcing strip 3. This positional stability is of importance particularly if an intermediate storage, for example, winding up of the semi-finished tube, is necessary or provided between the operation of applying the reinforcing strip 3 to inner tube 2 and the extrusion of outer tube 5. This stabilization of position, however, is advantageous also in instances where the operation of winding reinforcing strip 3 onto inner tube 2 is immediately followed by the extrusion of outer tube 5.

In order to obtain radial stability, it is important to wind the reinforcing strip onto inner tube 2 under a definite tension. A small winding tension results in a smaller radial stability, while a stronger tension results in a higher radial stability. This also applies to the cross-sectional shapes of FIGS. 2, 3 and 3a.

It may be learned from FIG. 6, that cavities 19 and 20 are formed between the adjacent turns of reinforcing strip 3 and also between adjacent reinforcing fins 8 of each turn of the reinforcing strip 3. The outer ends of reinforcing fins 8 partially penetrate into the wall of outer tube 5 and are integrally joined thereto.

The cavities 19 and 20 make the finished tube 1 very flexible, despite the very high radial stability of the tube. This flexibility is due to the fact that the inner tube 2 and outer tube 5, which are made of a soft PVC material, are relatively elastic, and the reinforcing fins 8 are bendable in the axial direction of the tube both toward and away from each other, so that cavities 19 and 20 may enlarge or contract, as the need arises. In the zones at the outer bending radius R1, cavities 19 and 20 are enlarged in the axial direction and reduced in the radial direction, i.e., a linear extension within the elasticity limits takes place.

On the contrary, in the zones at the inner bending radius R2, cavities 19 and 20 lessen in width, due to the pushing together of the turns of reinforcing strip 3, and also due to the movement against each other of the respective reinforcing gins 8 belonging to the same turn. At the same time, in this zone, outer tube 5 assumes an undulated shape, a radially inwardly extending wave trough forming between reinforcing fins 8 belonging to the same turn, and an outwardly extending wave crest forming in the zone of a cavities 19.

To ensure this flexibility or bending elasticity of tube 1, even in cases where the tube is provided with axial reinforcing threads 4, the number of which may amount to ten or twelve, it is provided that while the axial reinforcing threads 4 are brought in position on inner tube 2, loops are formed in the zones between every two turns of reinforcing strip 3, which permits the tube to stretch in the zone of outer bending radius R1. This also confers to the tube a certain special elasticity determined by the inner and outer tubes. Such a plastic tube may also be employed as a high-pressure tube, in which case, however, the reinforcing strip 3 must be provided in addition with reinforcing threads 16 extending in the groove-like recesses 10.

It should be added that in view of the positional stabilization described in the foregoing, there is no need for an integral bond between the metalized plastic tapes 17 and the reinforcing strip 3.

While specific embodiments of the invention have been shown and described in detail to illustrate the application of the principles of the invention, it will be understood that the invention may be embodied otherwise without departing from such principles.

What is claimed is:

1. A flexible plastic tube, comprising an extruded inner tube portion, an extruded outer tube portion of a thermoplastic or elastomeric material overlying and radially spaced outwardly from said inner tube, a substantially U-shaped reinforcing strip, laterally spaced sidewall fins with a first cavity therebetween, said strip extending in a helical path between said inner and said outer tube portions and firmly joined to said inner tube portion and being made of a hard, thermoplastic or elastomeric material, with a helical second cavity formed between the turns of said reinforcing strip, said strip being radially bonded to said inner tube portion and said outer tube portion, said first cavity being empty and axially laterally bounded by said sidewalls of said reinforcing strip, and said fins each having a radially outwardly tapering cross-sectional shape symmetrically diverging from the radial median plane of said strip, by which the cross-sectional shape of said second cavity is tapered in the radially outward direction.

2. A flexible plastic tube, as claimed in claim 1, wherein said fins are offset from each end of said reinforcing strip inwardly toward the center thereof by approximately from ¼ to ⅓ of the width of said strip.

3. A flexible plastic tube, as claimed in claim 1, wherein said fins extend at each side edge of said reinforcing strip.

4. A flexible plastic tube, as claimed in claim 1, wherein said reinforcing strip may be stretched so that the side fin walls thereof diverge in respect to each other to approximately the range of between 15° to 25°.

5. A flexible plastic tube, as claimed in claim 1, wherein said reinforcing strip includes an interior web wall between said sidewalls having a recess adjacent each side fin walls and a land separating said recesses adjacent each side fin wall.

6. A flexible plastic tube, as claimed in claim 1, including a metal foil applied over said reinforcing strip between said side fin walls.

7. A flexible plastic tube, as claimed in claim 1, including a plastic tape comprising a thin, aluminumized-metalized polyester strip adhesively secured to said reinforcing strip between said fin walls.

8. A flexible plastic tube, as claimed in claim 1, wherein said reinforcing strip includes a recess adjacent the connection of each sidewall thereto and a land formed between said recesses and a textile thread inserted into at least one of said recesses.

9. A flexible plastic tube, as claimed in claim 1, including a plurality of textile threads embedded in said reinforcing strip.

10. A flexible plastic tube, as claimed in claim 1, wherein said reinforcing strip includes a central web portion between each side fin wall having a recess therein at the connection of said fin wall to said strip undercutting each side fin wall.

11. A flexible plastic tube, as claimed in claim 1, wherein said reinforcing strip has a planar bottom surface engaged on said inner tubular portion having at least one claw rib of substantially triangular cross-section which extends parallel to said fin side walls and penetrates into said inner tubular portion.

12. A flexible plastic tube, as claimed in claim 1, wherein said reinforcing strip is heat-sealed to said inner tube portion.

13. A flexible plastic tube, as claimed in claim 1, wherein said second helical cavity is equal approximately to ½ the width of the reinforcing strip and the radial height of said reinforcing strip measured from the bottom surface thereof outwardly to the end thereof corresponds to approximately ⅔ of the width of said reinforcing strip.

14. A flexible plastic tube, as claimed in claim 1, wherein said inner tube portion has a wall thickness of about 0.5 mm, the inside diameter of said tube portion being from twice to three times the width of the reinforcing strip.

15. A flexible plastic tube, as claimed in claim 1, including a plurality of reinforcing threads provided on the outer surface of said inner tube and extending substantially axially therealong, said reinforcing strip having a bottom surface with projecting rib portions engageable into said inner tubular portion outer wall which extend transversely to said reinforcing threads and are heat-sealed into said inner wall.

* * * * *